US010690996B2

(12) United States Patent
Mak et al.

(10) Patent No.: US 10,690,996 B2
(45) Date of Patent: Jun. 23, 2020

(54) MAGNETIC INTERFERENCE-RESISTANT TRANSLATION-TYPE OPTICAL IMAGE STABILIZATION VOICE COIL MOTOR AND ITS METHOD OF ASSEMBLING

(71) Applicant: AP PHOTONICES (SHENZHEN) LIMITED, Shenzhen (CN)

(72) Inventors: Lin Chi Mak, Guangdong (CN); Wai Kwong Lo, Guangdong (CN); Yu Hui Peng, Guangdong (CN)

(73) Assignee: AP PHOTONICES (SHENZHEN) LIMITED, Shenzhen (CN)

( * ) Notice: Subject to any disclaimer, the term of this patent is extended or adjusted under 35 U.S.C. 154(b) by 253 days.

(21) Appl. No.: 15/893,569

(22) Filed: Feb. 9, 2018

(65) Prior Publication Data

US 2018/0164659 A1 Jun. 14, 2018

Related U.S. Application Data

(63) Continuation of application No. PCT/CN2015/086850, filed on Aug. 13, 2015.

(51) Int. Cl.
*G02B 27/64* (2006.01)
*G03B 5/00* (2006.01)
(Continued)

(52) U.S. Cl.
CPC ................ *G03B 5/00* (2013.01); *G02B 7/10* (2013.01); *G02B 27/646* (2013.01); *H02K 11/02* (2013.01);
(Continued)

(58) Field of Classification Search
CPC .......... G02B 27/646; G02B 7/09; G02B 7/04; G02B 13/001; G02B 7/023;
(Continued)

(56) References Cited

U.S. PATENT DOCUMENTS 7,663,818 B2 * 2/2010 Chung .................... G02B 7/08 359/814
7,663,823 B2 * 2/2010 Chung .................... G02B 7/08 359/824

(Continued)

FOREIGN PATENT DOCUMENTS

CN 104052214 A 9/2014
CN 203896166 U 10/2014
CN 104460180 A 3/2015

OTHER PUBLICATIONS

International Search Report of PCT Patent Application No. PCT/CN2015/086850 dated May 9, 2016.

*Primary Examiner* — Christopher Stanford

(57) ABSTRACT

A magnetic interference-resistant translation-type optical image stabilization voice coil motor includes a base, a spring plate, a lens carrier, at least three groups of magnets, and a housing. The base, the housing, and the groups of magnets are connected together to form a fixed structure. The groups of magnets are disposed inside the housing. Each group of magnets includes a first magnet and a second magnet stacked on the first magnet. The first magnet and the second magnet have opposite magnetic field directions. The lens carrier includes a body and coils disposed on the body. The number of the coils is the same as the number of the groups of magnets. Each of the coils is disposed opposite to one of the groups of magnets. The spring plate is connected to the lens carrier and one of the first magnet and the second magnet.

5 Claims, 13 Drawing Sheets

1241
122
1243
130
148
148
149
147
141
143

(51) Int. Cl.
*H02K 33/18* (2006.01)
*G02B 7/10* (2006.01)
*H02K 11/02* (2016.01)
*H02K 41/035* (2006.01)

(52) U.S. Cl.
CPC ......... *H02K 33/18* (2013.01); *H02K 41/0356* (2013.01); *G03B 2205/0007* (2013.01); *G03B 2205/0069* (2013.01)

(58) Field of Classification Search
CPC .... G03B 2205/0069; G03B 5/00; G03B 3/10; G03B 2205/0015
See application file for complete search history.

(56) References Cited

U.S. PATENT DOCUMENTS 10,116,849 B2 * 10/2018 Park .................. H02K 41/0356
2009/0278978 A1 * 11/2009 Suzuki .................... G02B 7/08 348/345
2010/0002317 A1 * 1/2010 Osaka ..................... G02B 7/08 359/824
2010/0098394 A1 * 4/2010 Ishihara .............. G02B 27/646 396/55
2011/0096178 A1 * 4/2011 Ryu et al. ........... H04N 5/2252 348/208.2
2011/0205646 A1 * 8/2011 Sato ....................... F16F 1/027 359/824
2012/0008221 A1 * 1/2012 Min et al. .......... H02K 41/0356 359/824
2012/0025633 A1 * 2/2012 Lee ...................... H04N 5/2254 310/12.16
2012/0154614 A1 * 6/2012 Moriya .................... G03B 3/10 348/208.5
2013/0076924 A1 * 3/2013 Wade ...................... G03B 5/02 348/208.11
2013/0089311 A1 * 4/2013 Jung .................... H04N 5/2257 396/55
2013/0120861 A1 * 5/2013 Park ...................... G02B 15/14 359/824
2013/0170040 A1 7/2013 Yu
2013/0170052 A1 * 7/2013 Yu .......................... G02B 7/08 359/813
2014/0313582 A1 * 10/2014 Cheng ..................... G02B 7/09 359/557
2014/0355142 A1 * 12/2014 Hung ...................... G02B 7/08 359/824
2015/0177478 A1 * 6/2015 Hagiwara ................ G02B 7/09 359/824
2015/0212291 A1 * 7/2015 Lee ......................... G02B 7/08 348/360
2015/0355477 A1 * 12/2015 Sato ...................... G02B 27/64 359/557
2015/0364980 A1 * 12/2015 Liao .................. H02K 41/0356 310/12.16
2016/0048002 A1 * 2/2016 Cheng ..................... G02B 7/09 359/557
2016/0187668 A1 * 6/2016 Hayashi .............. G02B 27/646 359/507

* cited by examiner

MAGNETIC INTERFERENCE-RESISTANT TRANSLATION-TYPE OPTICAL IMAGE STABILIZATION VOICE COIL MOTOR AND ITS METHOD OF ASSEMBLING

CROSS-REFERENCE TO RELATED APPLICATIONS

The present application is a Continuation Application of PCT application No. PCT/CN2015/086850 filed on Aug. 13, 2015, the contents of which are hereby incorporated by reference.

TECHNICAL FIELD

The present invention relates to a voice coil motor in an accessory for electronic devices, and in particular to a magnetic interference-resistant translation-type optical image stabilization voice coil motor and a method for assembling the same.

BACKGROUND

At present, micro optical image stabilization voice coil motors have been widely applied to high-end mobile phones, and can effectively reduce the probability of blurred images during photographing in a low-light environment, and reduce the disturbing jitter in the image. However, compared with ordinary autofocus motors, optical image stabilization voice coil motors have a complex design and low production yield and efficiency. Therefore, image stabilization voice coil motors are mainly applied to high-end mobile phones and have not been widely applied to middle- and low-end mobile phones, which has severely affected use experiences of mobile terminal users such as mobile phone users.

Micro optical image stabilization voice coil motors may be classified into the following three types: camera-module-axis-shifting-type in which the voice coil motor controls the lens and the image sensor to rotate together; lens-translation-type in which the voice coil motor controls the lens to translate, with the image sensor being kept still; lens-axis-shifting-type in which the voice coil motor controls the lens to rotate, with the image sensor being kept still.

Each of the three types of voice coil motors has its own advantages and drawbacks. For example, the camera-module-axis-shifting-type voice coil motor has advantages of optimum optical image stabilization effect and image quality, but has drawbacks of a heavy weight and thus a large power consumption. The lens-axis-shifting-type voice coil motor has advantages of a relatively simple structure and easy production, but has a drawback of a possibly reduced resolution at image edges during optical image stabilization. The lens-translation-type voice coil motor has a structure complexity and an image edge resolution in between those of the camera-module-axis-shifting-type voice coil motor and the lens-axis-shifting-type voice coil motor that are acceptable for manufacturers and users, and an acceptable power consumption as well. Therefore, the lens-translation-type voice coil motor has become a prevalent component used in image stabilization solutions for mobile terminals, such as mobile phones.

However, conventional lens-translation-type voice coil motors generally include a large number of components and thus have a complex structure, which is not beneficial for production, and makes it difficult to achieve improved reliability and reduced costs. Moreover, loadstones in these lens-translation-type voice coil motors are generally located in a movable structure, making them susceptible to interferences from external magnetic fields and have a degraded performance.

SUMMARY

In view of this, the present invention provides a translation-type magnetic interference-resistant optical image stabilization voice coil motor of a simple structure and a method of assembling the same.

The present invention provides a magnetic interference-resistant translation-type optical image stabilization voice coil motor including a base, a spring plate, a lens carrier, at least three groups of magnets, and a housing; in which the base, the housing, and the groups of magnets are connected together to form a fixed structure; the at least three groups of magnets are arranged inside the housing; each of the groups of magnets includes a first magnet and a second magnet; the first magnet is arranged on the base; the second magnet is stacked on the first magnet, and the first magnet and the second magnet have opposite magnetic field directions; the lens carrier includes a body and coils disposed on the body; the coils and the body are connected together to form a movable structure; the number of the coils is the same as the number of the groups of magnets; each of the coils is disposed opposite to one of the groups of magnets; the spring plate is connected to the lens carrier and one of the first magnet and the second magnet to form a spring oscillator system with multiple degrees of freedom; the spring oscillator system with multiple degrees of freedom includes a spring center; and a resultant electromagnetic force of each of the coils is in a direction facing the spring center or facing away from the spring center.

Preferably, the first magnet and the second magnet have different sizes or shapes.

Preferably, one part of the spring plate is connected to the base and a bottom of the body, and another part of the spring plate is connected to the first magnet.

Preferably, one part of the spring plate is connected to a top of the body, and another part of the spring plate is connected to the second magnet and the housing.

Preferably, positioning portions are formed on the base; the lens carrier further includes positioning slots formed on the body; and the positioning portions are mated with the positioning slots.

Preferably, the magnetic interference-resistant translation-type optical image stabilization voice coil motor further includes a press ring; the press ring is disposed between the base and the spring plate; and the press ring presses the spring plate under the lens carrier and is connected to the spring plate.

Preferably, the press ring includes an annular base body and a plurality of extension elements formed on the base body; the base body presses the spring plate under the lens carrier and is connected to the spring plate; the lens carrier further includes a plurality of notches formed on the body; a through hole is formed in the base plate; the base further includes a stepped portion extending inward from an inner surface of the base plate; the plurality of extension elements is regularly disposed on an inner surface of the base body along a circumferential direction of the base body; each of the extension elements includes a first extension portion and a second extension portion; the first extension portion extends from the base body toward the lens carrier and into a corresponding notch on the lens carrier; and the second extension portion extends from the base body toward the base to come into contact with the stepped portion on the base.

Preferably, the lens carrier further includes a plurality of third extension portions formed on the body; the notches and the third extension portions are disposed alternately along a circumferential direction of the body; and the third extension portions extend from the body toward the stepped portion to come into contact with the stepped portion.

Preferably, the second extension portions and the third extension portions are disposed alternately along the circumferential direction of the body and in continuous contact with the stepped portion along the circumferential direction of the body.

The present invention further provides a method of assembling the magnetic interference-resistant translation-type optical image stabilization voice coil motor described above, including:

winding a conductive wire around a winding column and a boss on the lens carrier to form the coil;

placing the spring plate below the lens carrier, and passing a winding column under the lens carrier through a hole in the spring plate;

mechanically connecting the spring plate to the lens carrier;

electrically connecting the spring plate to the conductive wire;

placing the press ring below the spring plate and mechanically connecting them to each other;

placing the spring plate above the base and mechanically connecting the spring plate to the base, and then electrically connecting the spring plate to a conductive portion on the base;

fixing the groups of magnets to the inner wall of the housing and placing the lens carrier inside the housing, in such a manner that each of the coils is opposite to one of the groups of magnets; and mechanically connecting the spring plate to a bottom of the first magnet.

The present invention has the following beneficial effects. Because the groups of magnets are arranged in the fixed structure, performance of the magnetic interference-resistant translation-type optical image stabilization voice coil motor is not likely to be affected by external magnetic fields, and accordingly the motor has a magnetic interference-resistant performance. Moreover, the first magnet and the second magnet having opposite magnetic field directions are stacked on the base, such that a resultant force of each of the coils substantially faces the spring center or faces away from the spring center and has a very small arm of force and a very small moment of force. Therefore, even when the optical image stabilization function is enabled or when auto focusing is being performed, no noticeable off-axis tilt will occur in the magnetic interference-resistant translation-type optical image stabilization voice coil motor, thus a desirable resolution is maintained at image edges. Moreover, the motor has a simple structure, which can facilitate production, improve reliability, and reduce costs.

BRIEF DESCRIPTION OF THE DRAWINGS

To provide a clearer description of the technical solutions in the embodiments of the present invention, accompanying drawings used for describing the embodiments will be briefly described in the following. Apparently, the accompanying drawings in the following description show merely some embodiments of the present invention. For those skilled in the art, other drawings may also be obtained based on these drawings without creative efforts.

DESCRIPTION OF THE EMBODIMENTS

To provide a better understanding of the above objects, features, and advantages of the present invention, the technical solutions of the present invention are further described in detail below with reference to the accompanying drawings and embodiments. It should be noted that, the embodiments of the present invention and the features in the embodiments can be combined with each other as long as there is not any conflict therebetween.

Numerous specific details are set forth in the following description in order to provide a thorough understanding of the present invention, but the present invention may be embodied in other forms than those described herein, and thus the scope of the present invention is not limited to the specific embodiments disclosed below. In the specific embodiments of the present invention, terms such as “first” and “second” are used for distinguishing different technical features from each other, and the terms may be altered as needed, and should not be interpreted as a limitation to the present invention.

Figure 1:
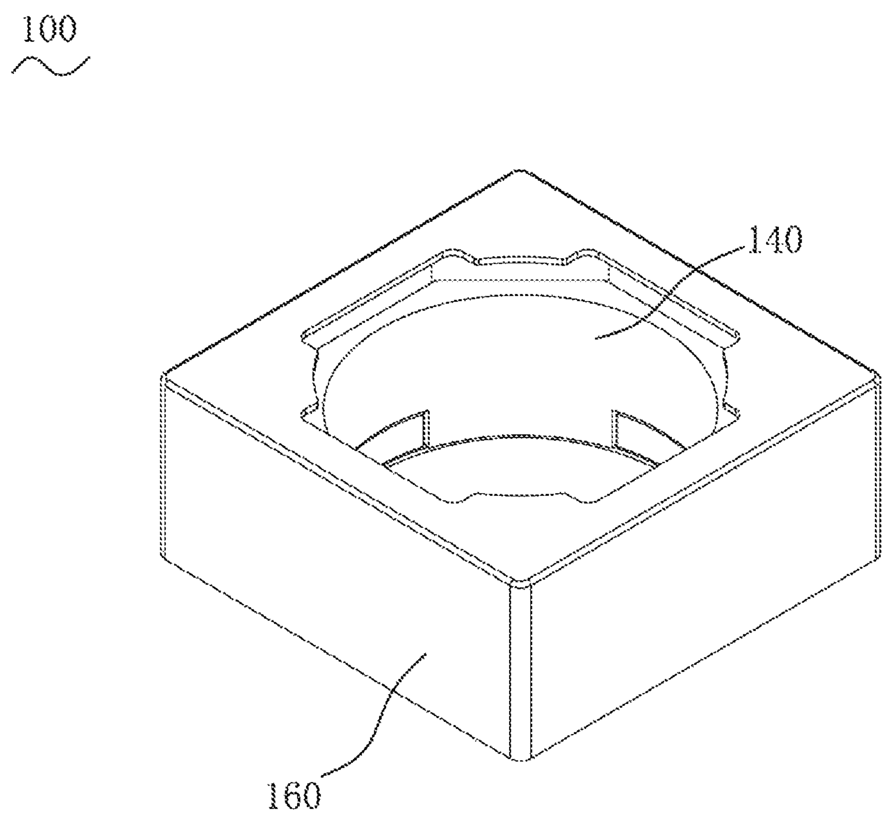
FIG. 1 is a schematic structural view of a magnetic interference-resistant translation-type optical image stabilization voice coil motor according to an embodiment of the present invention.
Figure 2:
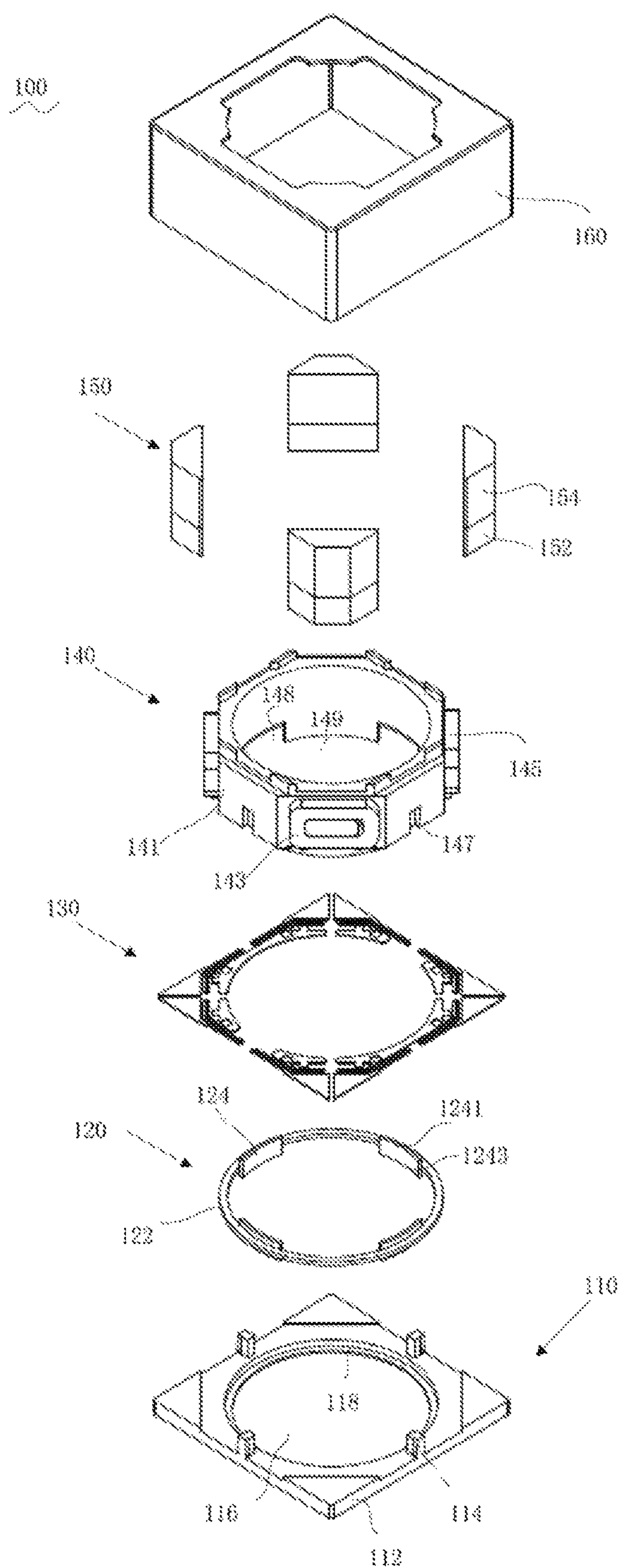
FIG. 2 is a schematic exploded view of the magnetic interference-resistant translation-type optical image stabilization voice coil motor shown in FIG. 1.

FIG. 1 is a schematic structural view of a magnetic interference-resistant translation-type optical image stabilization voice coil motor 100 according to an embodiment of the present invention. FIG. 2 is a schematic exploded view of the magnetic interference-resistant translation-type optical image stabilization voice coil motor 100 shown in FIG. 1. As shown in FIGS. 1 and 2, the magnetic interference-resistant translation-type optical image stabilization voice coil motor 100 includes a base 110, a press ring 120, a spring plate 130, a lens carrier 140, groups of magnets 150, and a housing 160. The press ring 120, the spring plate 130, the lens carrier 140, and the groups of magnets 150 are positioned inside a case formed by the base 110 and the housing 160.

Figure 5:
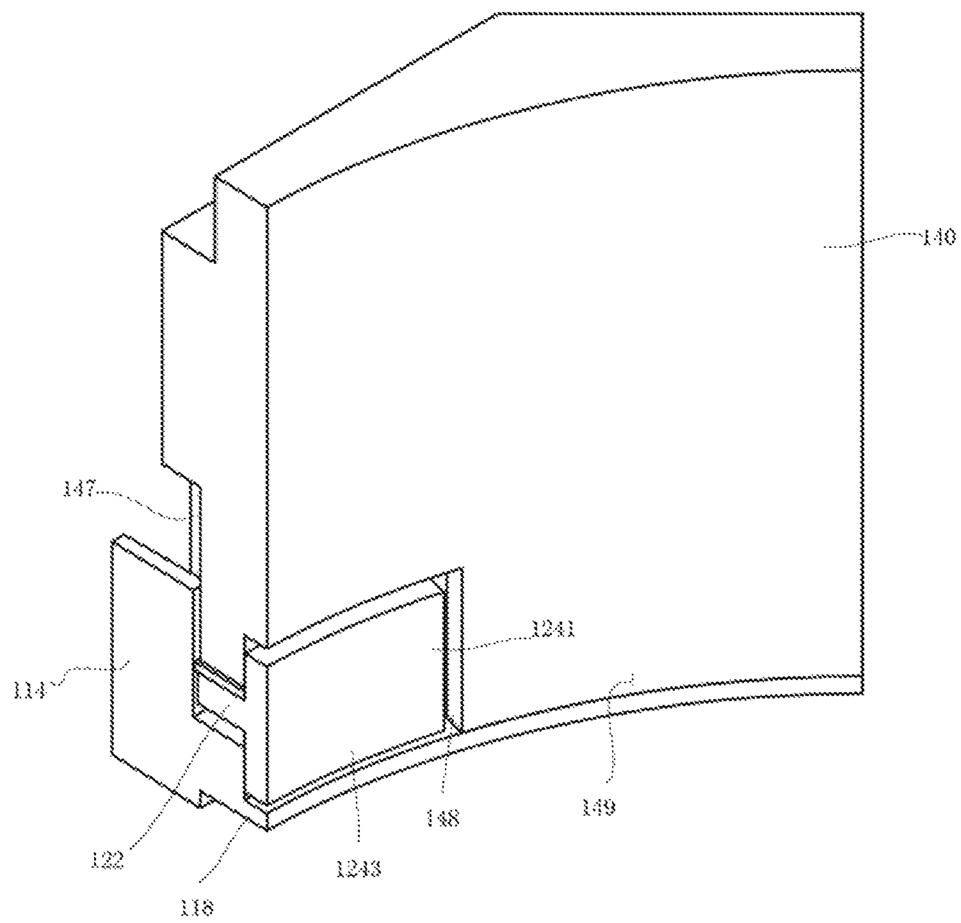
FIG. 5 is a schematic view showing connections between the lens carrier, the press ring, and the base in the magnetic interference-resistant translation-type optical image stabilization voice coil motor shown in FIG. 2.

Specifically, the base 110 includes a base plate 112 and positioning portions 114 formed on the base plate 112. In the embodiment shown in FIG. 2, the positioning portions 114 include a plurality of protrusions that protrude from the base plate 112 toward the lens carrier 140, for the purpose of positioning and/or retaining (as will be further described below) in combination with positioning slots 147 on the lens carrier 140 (as shown in FIG. 5). A through hole 116 is formed at the center of the base plate 112. The base 110 further includes a stepped portion 118 extending inward from an inner surface of the base plate 112. In the embodiment shown in FIG. 2, the stepped portion 118 is an annular stepped structure positioned in the through hole 116, for the purpose of dust prevention and the like in combination with the press ring 120 and the lens carrier 140 (as will be further described below).

Further, the base 110 also includes a conductive portion to be electrically connected to external components such as a printed circuit board.

The press ring 120 is disposed between the base 110 and the spring plate 130. The press ring 120 includes an annular base body 122 and a plurality of extension elements 124 formed on the base body 122. The base body 122 presses the spring plate 130 below the lens carrier 140 (when the magnetic interference-resistant translation-type optical image stabilization voice coil motor 100 is in a position shown in FIG. 2) and may be mechanically connected to the spring plate 130 by means of an adhesive, for example. Compared with the spring plate 130, which is relatively thin, the base body 122 has a large thickness, in order to protect the thin spring plate 130 and enhance its resistance to dropping. Moreover, the base body 122 of the press ring 120 enables the spring plate 130 to be flattened below the lens carrier 140, thereby alleviating problems caused by nonflatness of the spring plate 130, such as movement and tilt during focusing and initial current errors, and increasing consistency and production yield of the magnetic interference-resistant translation-type optical image stabilization voice coil motor 100.

The plurality of extension element 124 is regularly disposed on the inner surface of the base body 122 along a circumferential direction of the base body 122. Each of the extension elements 124 includes a first extension portion 1241 and a second extension portion 1243. The first extension portion 1241 extends upward from the base body 122 to above the base body 122, that is, extends toward the lens carrier 140 and into a corresponding notch 148 on the lens carrier 140 (as shown in FIG. 5); and the second extension portion 1243 extends downward from the base body 122 to below the base body 122, that is, extends toward the base 110 to come into contact with the stepped portion 118 on the base 110. As such, the first extension portion 1241 and the second extension portion 1243 of each of the extension elements 124 are mated with the notch 148 and the stepped portion 118 respectively, so as to reduce effectively the space between the lens carrier 140 and the base 110, such that external dust can be prevented from arriving below the lens carrier 140 through the space between the lens carrier 140 and the base 110 and contaminating a filter or image sensor below the lens carrier 140, thereby improving reliability of the camera module.

Figure 3:
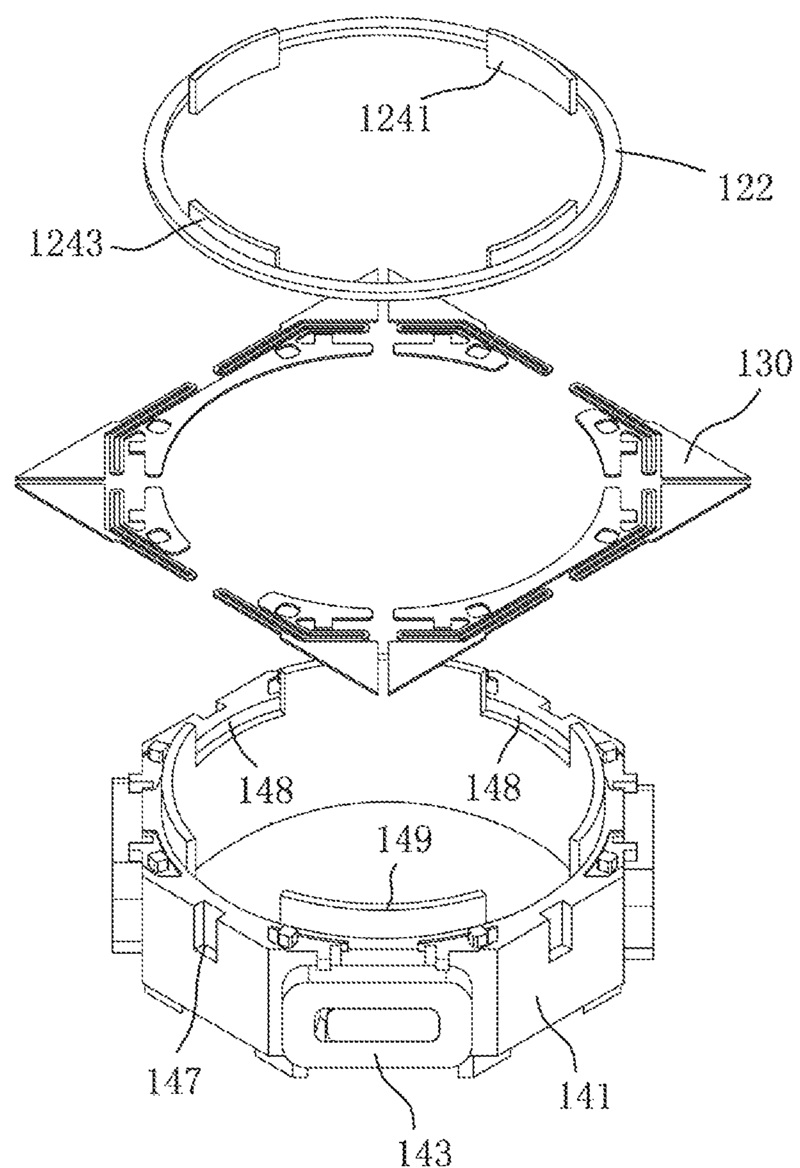
FIG. 3 is a schematic enlarged view showing a lens carrier, a spring plate, and a press ring in the magnetic interference-resistant translation-type optical image stabilization voice coil motor in FIG. 2 viewed from another aspect.
Figure 4:
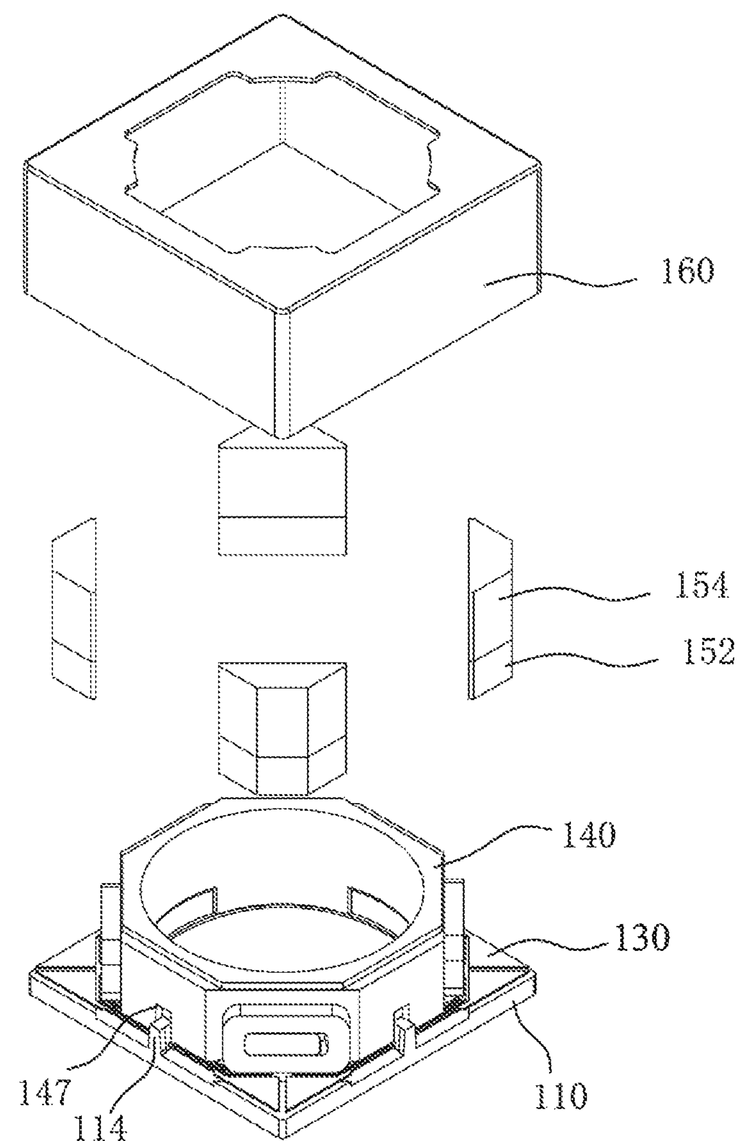
FIG. 4 is a schematic view showing a process of assembling the magnetic interference-resistant translation-type optical image stabilization voice coil motor shown in FIG. 2.

As shown in FIGS. 2 and 3, the lens carrier 140 includes a body 141, bosses 143, an upper winding column and a lower winding column (not shown), coils 145, third extension portions 149, and the positioning slots 147 and notches 148 described above. The body 141 is a hollow annular structure having an inner wall that can be in close contact with the lens, such that the lens can move with multiple degrees of freedom to achieve auto-focusing and optical image stabilization functions. The bosses 143 are formed on an outer surface of the body 141. The upper winding column and the lower winding column are formed respectively at an upper end and a lower end of the body 141. In an embodiment, the arrangement of the bosses 143, the upper winding column, and the lower winding column on the body 141 and functions thereof can be understood with reference to the upper winding column, the lower winding column, and the bosses described in Chinese Patent CN104052214 that allow direct winding, which can facilitate mass production, even fully automatic mass production.

A plurality of independent coils 145, such as three, four, or more coils 145, are disposed on the outer wall of the body 141 and each correspond to one of the groups of magnets 150, and are connected to the body 141 to form a movable structure. The coils 145 are wound from a conductive wire, and each of the coils have a first wire end and a second wire end.

As shown in FIGS. 2 to 5, the positioning slots 147 are formed in the outer surface of the body 141 and are each disposed corresponding to one of the positioning portions 114. Each of the positioning portions 114 is mated with a corresponding positioning slot 147 for the purpose of positioning and/or retaining for ease of assembling and positioning. The notches 148 and the third extension portions 149 are formed on the inner surface of the body 141 and are disposed alternately along a circumferential direction of the body 141. The third extension portions 149 extend from the body 141 toward the stepped portion 118 to come into contact with the stepped portion 118. As such, the first extension portion 1241 and the notch 148 are mated with each other. Meanwhile, the second extension portions 1243 and the third extension portions 149 are arranged alternately along the circumferential direction of the body 141 and in continuous contact with the stepped portion 118 along the circumferential direction of the body 141, thereby effectively reducing the space between the lens carrier 140 and the base 110, such that external dust can be prevented from entering a position below the lens carrier 140 through the space between the lens carrier 140 and the base 110 and contaminating the filter or image sensor below the lens carrier 140, thereby improving reliability of the camera module.

Figure 7:
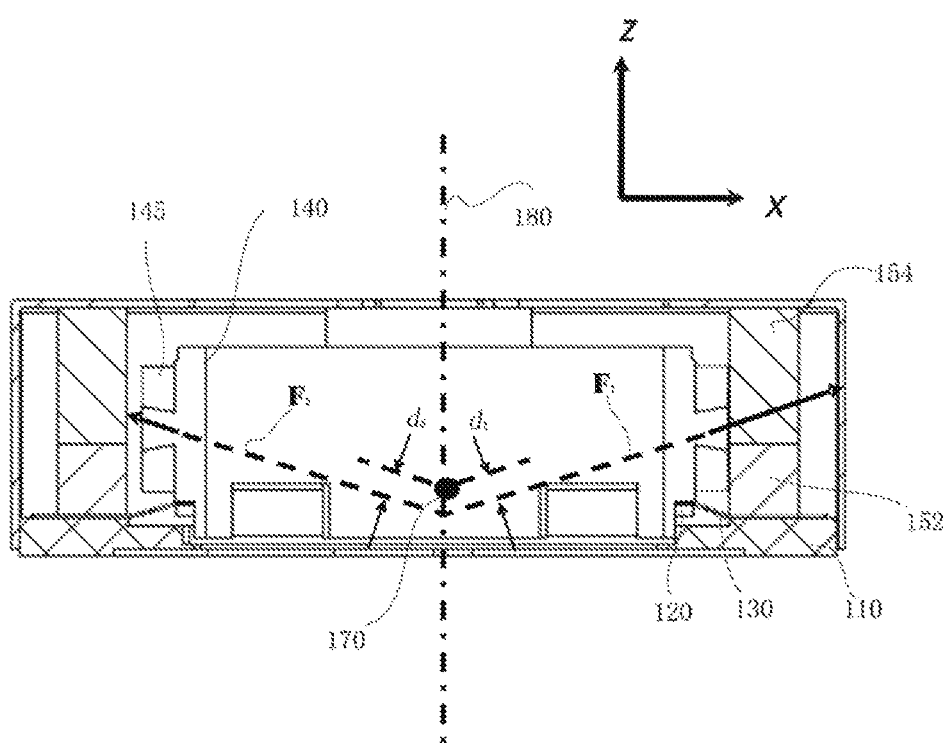
FIG. 7 is a cross-sectional view of the magnetic interference-resistant translation-type optical image stabilization voice coil motor shown in FIG. 6.
Figure 8:
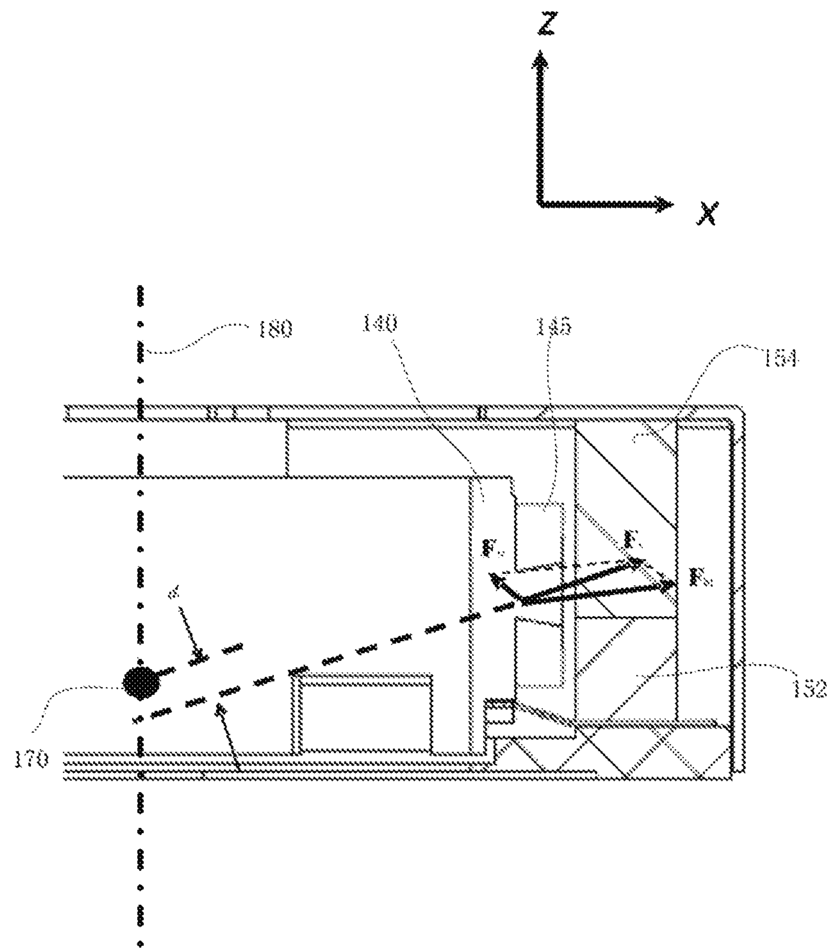
FIG. 8 shows forces applied by the first magnet and the second magnet in the group of magnets to the corresponding coils and a resultant force thereof in the magnetic interference-resistant translation-type optical image stabilization voice coil motor.
Figure 10:
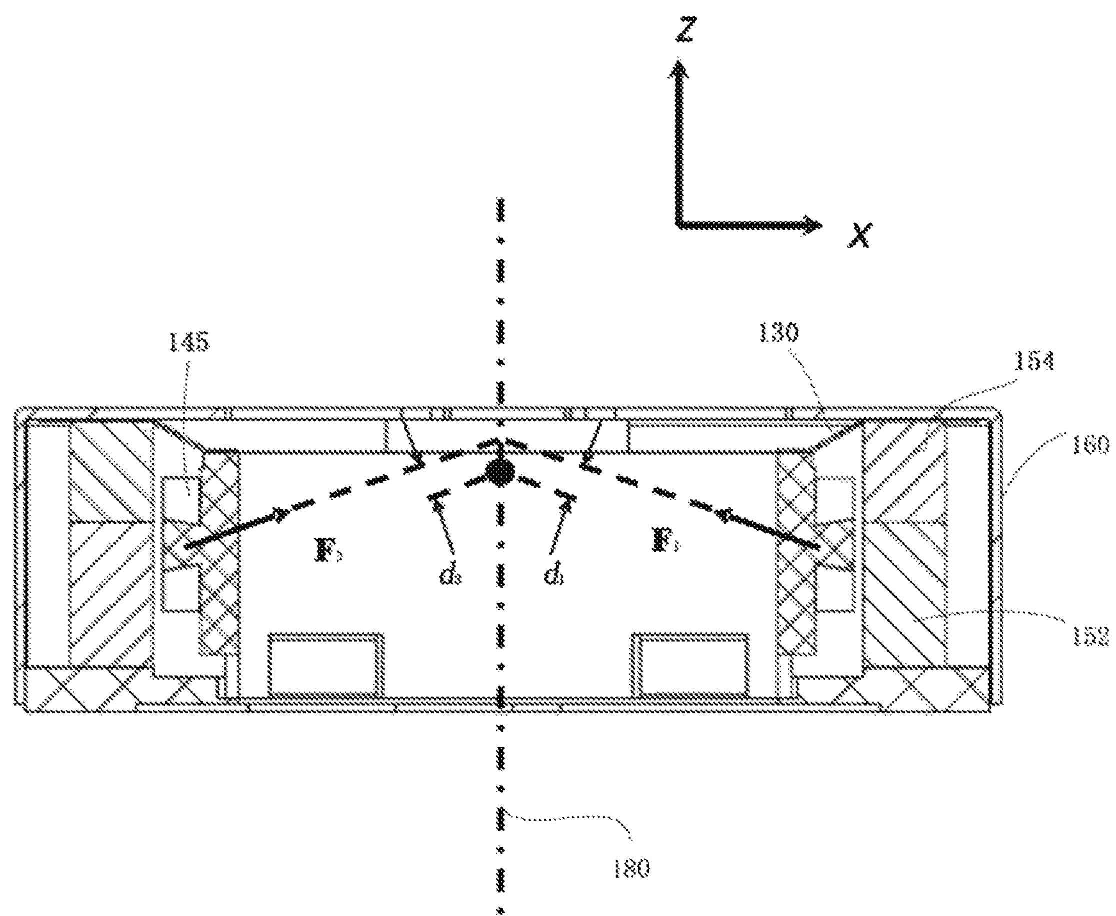
FIG. 10 is a schematic cross-sectional view of a magnetic interference-resistant translation-type optical image stabilization voice coil motor according to an embodiment of the present invention.
Figure 11:
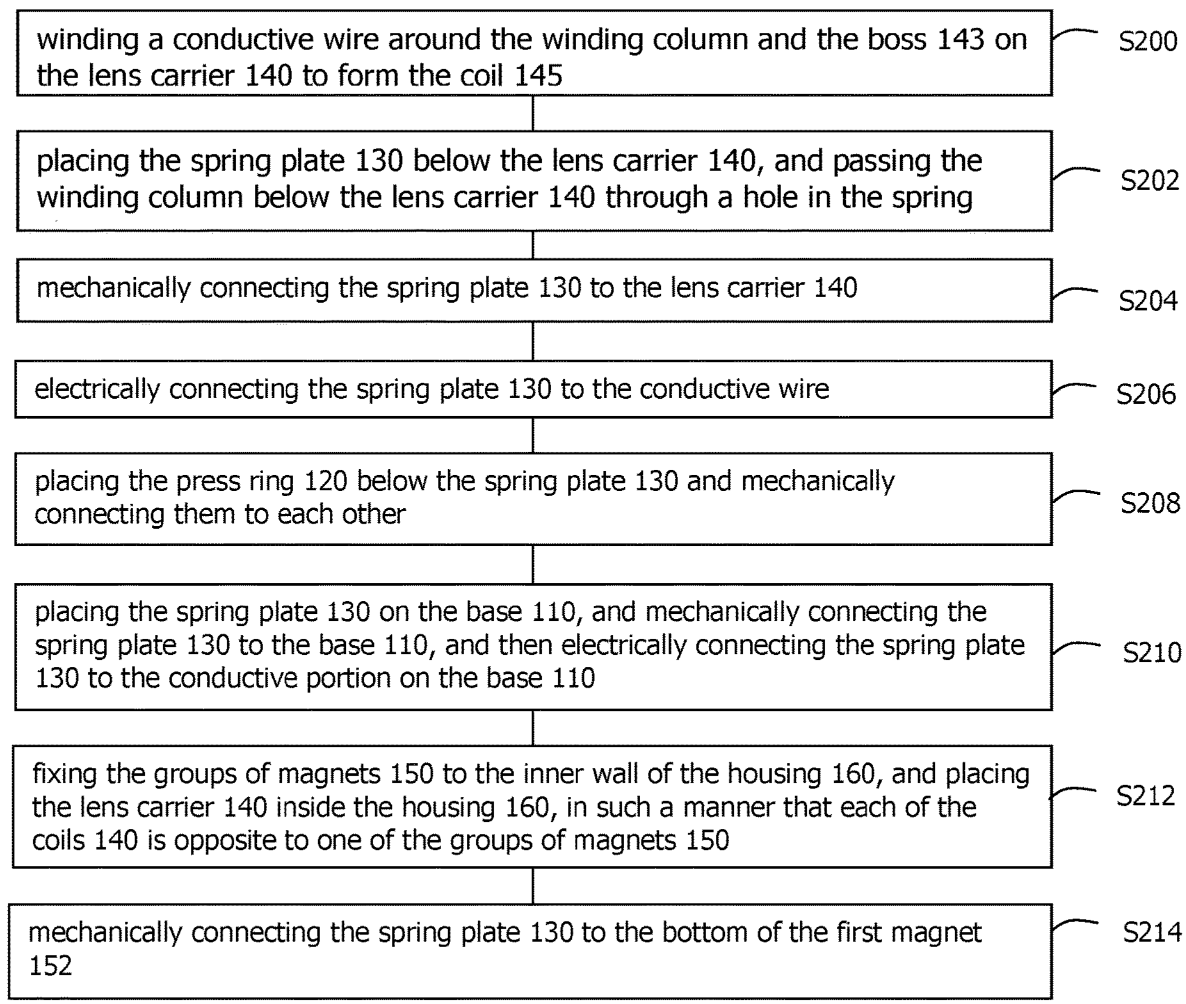
FIG. 11 is a schematic flow chart showing a method for assembling a magnetic interference-resistant translation-type optical image stabilization voice coil motor according to an embodiment of the present invention.

The spring plate 130 may be arranged below (as shown in FIG. 2 and FIGS. 7-8) or above (as shown in FIG. 10) the lens carrier 140. In the embodiment shown in FIGS. 7-8, one part of the spring plate 130 is mechanically connected to the base 110 and electrically connected to the conductive portion of the base 110. Another part of the spring plate 130 is mechanically connected to a bottom of the group of magnets 150. At least three conductive paths are disposed on the spring plate 130. The first wire end and the second wire end of the coil 145 are electrically connected to two ends of the conductive path respectively. As such, the spring plate 130 electrically connects the coils 145 to the conductive portion in the base 110 directly or indirectly.

Figure 9A:
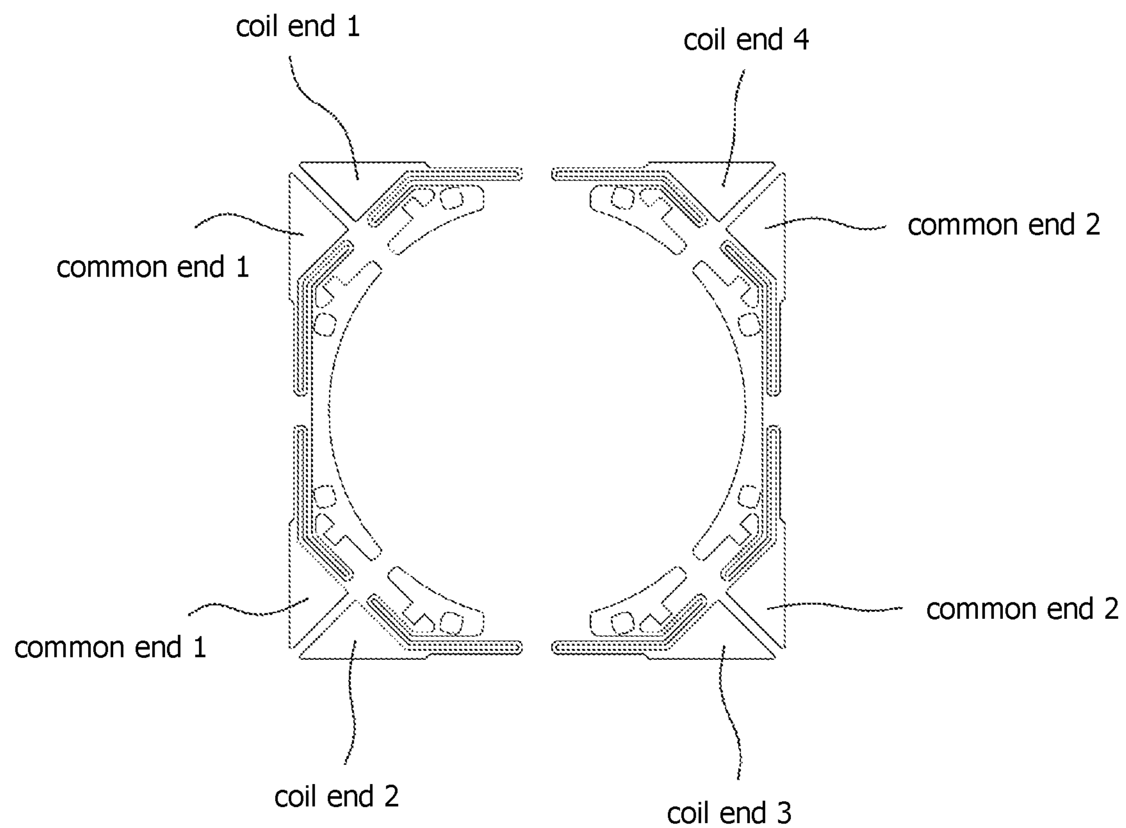
FIGS. 9*a-c* show several examples of the spring plate shown in FIG. 2.
Figure 9B:
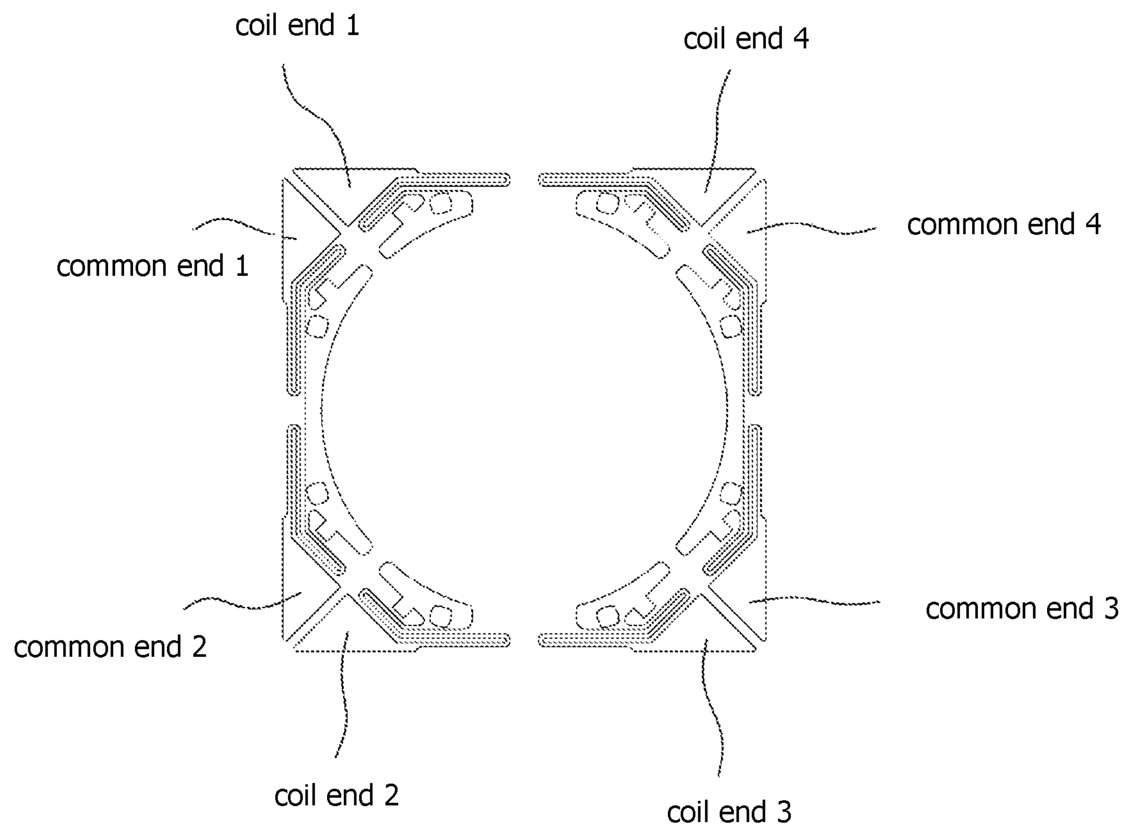
Figure 9C:
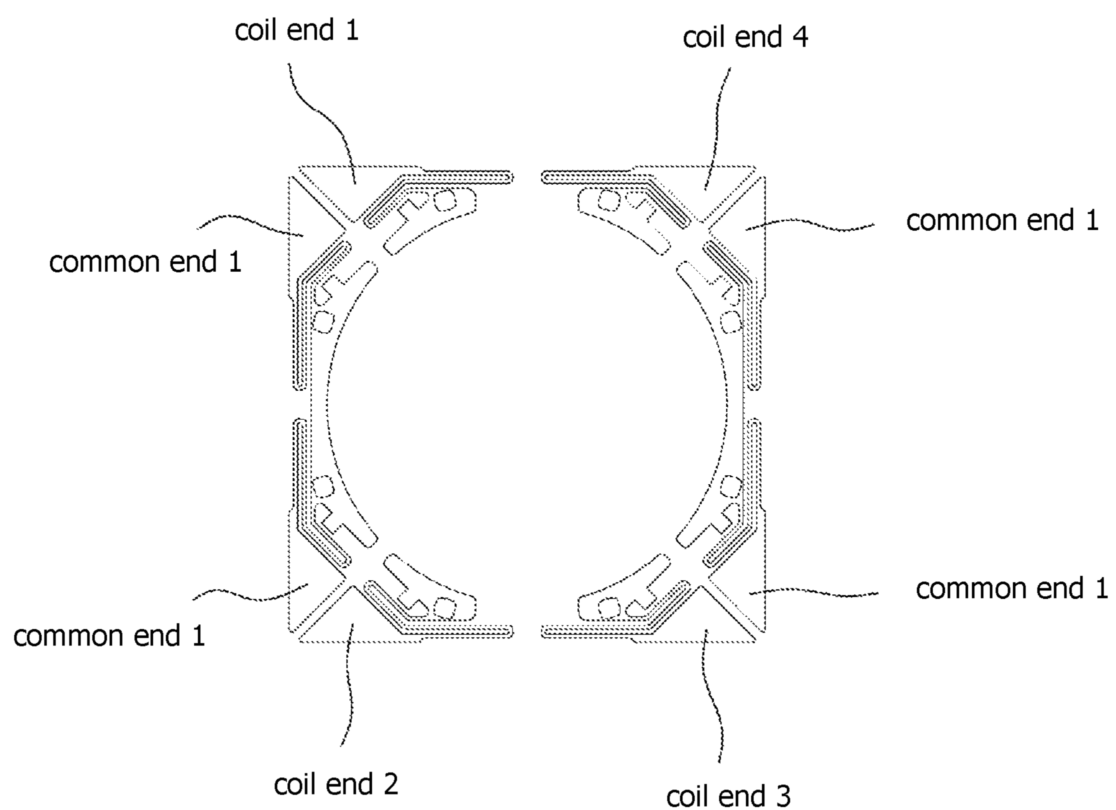

FIGS. 9*a-c* show several examples of the spring plate 130. In the example shown in FIG. 9*a*, the spring plate 130 consists of six independent pieces of conducive elastic material that serve respectively as coil ends 1 to 4 and common ends 1 and 2. The table 1 below shows a preferred connection between the four coils, the coil ends, and the common ends.

TABLE 1

| coil end | coil | common end |
|---|---|---|
| 1 | 1 | 1 |
| 2 | 2 | 1 |
| 3 | 3 | 2 |
| 4 | 4 | 2 |

The common ends may be grounded or connected to the power supply. By controlling current, voltage, or pulse width of the coil ends 1 to 4, current through the coils 1 to 4 can be controlled, so as to achieve auto-focusing and optical image stabilization effects.

In the example shown in FIG. 9*b*, the spring plate 130 consists of four coil ends and four common ends. The table 2 below shows a possible electrical connection between the coil ends, the coils, and the common ends of the spring plate 130. If such a connection is used for the structure in a preferred embodiment, then an H-bridge may be used to control the current through the coil and its direction.

TABLE 2

| coil end | coil | common end |
|---|---|---|
| 1 | 1 | 1 |
| 2 | 2 | 2 |
| 3 | 3 | 3 |
| 4 | 4 | 4 |

In the embodiment shown in FIG. 9*c*, the spring plate 130 consists of four coil ends and one common end. The table 3 below shows a possible electrical connection between the coil ends, the coils, and the common end of the spring plate 130.

TABLE 3

| coil end | coil | common end |
|---|---|---|
| 1 | 1 | 1 |
| 2 | 2 | 1 |
| 3 | 3 | 1 |
| 4 | 4 | 1 |

The groups of magnets 150 are fixed to the inner wall of the housing 160, and the groups of magnets 150, the housing 160, and the base 110 are connected together to form a fixed structure. The number of the groups of magnets 150 is the same as the number of the coils 145, and each of the groups of magnets 150 is disposed opposite to one of the coil 145. In an embodiment, there may be three, four, or more groups of magnets 150. Each of the groups of magnets 150 includes a first magnet 152 and a second magnet 154. The first magnet 152 and the second magnet 154 are stacked in a direction substantially perpendicular to the base 110. For example, as shown in FIG. 7, the first magnet 152 is disposed on the base 110, and the second magnet 154 is disposed on the first magnet 152 and in contact with the housing 160. The first magnet 152 and the second magnet 154 have opposite magnetic field directions, that is, the magnetic field direction of one of the first magnet 152 and the second magnet 154 faces the lens carrier 140, whereas the magnetic field direction of the other of the first magnet 152 and the second magnet 154 faces away from the lens carrier 140. The shapes and sizes of the first magnet 152 and the second magnet 154 may be adjusted as needed and may be the same or different so as to meet various requirements. The first magnet 152 and the second magnet 154 may be loadstones.

The specific structure of the magnetic interference-resistant translation-type optical image stabilization voice coil motor 100 according to an embodiment of the present invention has been described above, and the operation thereof will be briefly explained in the following.

Figure 6:
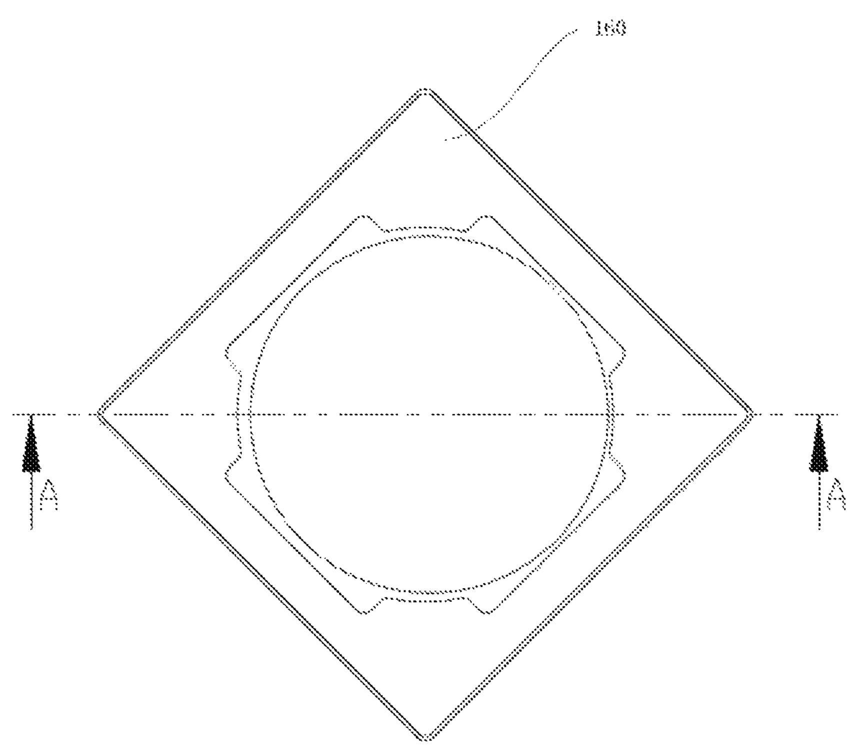
FIG. 6 is a top view of the magnetic interference-resistant translation-type optical image stabilization voice coil motor shown in FIG. 1.

As described above, the coils 145 are connected to the body 141 of the lens carrier 140 to form a movable structure. The groups of magnets 150, the housing 160, and the base 110 are connected to each other to form a fixed structure. The spring plate 130 connects the lens carrier 140 to the fixed structure to form a spring oscillator system with multiple degrees of freedom. As shown in FIGS. 6-8, the spring oscillator system with multiple degrees of freedom includes a center of rotation for the spring 170 (referred to as spring center below). When a moment of force is applied to said system, the system rotates around the spring center 170. By adjusting spring coefficients of the springs in the spring oscillator system, the position of the spring center 170 can be adjusted. By adjusting the positions, sizes, and shapes of the coils 145 as well as of the first magnet 152 and the second magnet 154, the direction of the resultant electromagnetic force of each of the coils 145 when energized can be adjusted.

During operation of the magnetic interference-resistant translation-type optical image stabilization voice coil motor 100, as shown in FIGS. 7, 8, and 10, each of the coils 145, when energized, has a resultant electromagnetic force in a direction that is adjusted to substantially face the spring center 170 or face away from the spring center 170. When an optical axis 180 of the magnetic interference-resistant translation-type optical image stabilization voice coil motor 100 is directed upward, the direction of the resultant force may be tilt upward or downward. Because each of the forces has a very small moment arm (shown in FIGS. 7, 8, and 10 as $d_1$ and $d_3$) and consequently a very small moment of force, no noticeable off-axis tilt will occur, thereby reducing impact on the resolution at image edges. By adjusting the magnitude and direction of the current in each of the coils 145 as well as the magnitude and direction of the resultant force, focusing (shift in $_z$ direction) and translation-type optical image stabilization (shifts in $_x$ and $_y$ directions) effects can be achieved.

FIG. 8 shows, as an example, an electromagnetic force ($F_{t1}$) applied to the coils 145 by the second magnet 154, an electromagnetic force ($F_{b1}$) applied to the coils 145 by the first magnet 152, and a resultant force of both electromagnetic forces ($F_1=F_{t1}+F_{b1}$ shown in FIG. 8). Because the second magnet 154 and the coils 145 have the same magnetic field direction, they are attracted to each other, therefore the direction of $F_{t1}$ substantially faces the second magnet 154. On the contrary, because the first magnet 152 and the coils 145 have opposite magnetic field directions, they repel each other, therefore the direction of Fb1 substantially faces away from the first magnet 152.

By controlling the magnitude and direction of the current through each of the four coils 145, the magnitude and direction of the resultant force in each of the coils 145 can be controlled independently, such that the lens are controlled to translate in two directions (x and y directions for optical image stabilization) and shift along the optical axis 180 (z direction for auto-focusing). Because the coils 145 have a resultant force of a magnitude close to each other, the total resultant force of all the coils 145 is in a direction parallel to the optical axis 180, such that the lens carrier 140 can shift along the optical axis to achieve auto-focusing effect. In the example mentioned above, as the sizes of the first magnet 152 and the second magnet 154 as well as the positions of the coils 145 have been optimized, both resultant forces have very small moment arms ($d_1$, $d_3$) and consequently very small moments of force ($\tau_1=\|F_1\|\times d_1\tau_3\times\|F_3\|\times d_3$), without causing noticeable off-axis tilt, thereby reducing impact on the resolution at image edges.

Further, in other embodiments, the press ring may be omitted. In other embodiments, an additional shift sensor, such as a Hall effect sensor, may further be provided to allow the magnetic interference-resistant translation-type optical image stabilization voice coil motor 100 to be driven through closed loop control, so as to achieve auto-focusing or optical image stabilization effects.

A method for assembling the magnetic interference-resistant translation-type optical image stabilization voice coil motor 100 will be briefly described below. The method for assembling includes the following steps.

Step S200: winding a conductive wire around the winding column and the boss 143 on the lens carrier 140 to form the coil 145;

Step S202: placing the spring plate 130 below the lens carrier 140, and passing the winding column under the lens carrier 140 through a hole in the spring plate;

Step S204: mechanically connecting the spring plate 130 to the lens carrier 140;

Step S206: electrically connecting the spring plate 130 to the conductive wire;

Step S208: placing the press ring 120 below the spring plate 130 and mechanically connecting them to each other;

Step S210: placing the spring plate 130 above the base 110, and mechanically connecting the spring plate 130 to the base 110, and then electrically connecting the spring plate 130 to the conductive portion on the base 110;

Step S212: fixing the groups of magnets 150 to the inner wall of the housing 160, and placing the lens carrier 140 inside the housing 160, in such a manner that each of the coils 140 is opposite to one of the groups of magnets 150; and Step S214: mechanically connecting the spring plate 130 to the bottom of the first magnet 152.

In step S200, the conductive wire is wound around the winding column and the boss 143 on the lens carrier 140 to form the coil 145 specifically by using the automatic winding method disclosed in Chinese Patent CN104052214.

The magnetic interference-resistant translation-type optical image stabilization voice coil motor 100 according to an embodiment of the present invention and a method for assembling the same have at least the following advantages:

(1) By controlling the magnitude and direction of the current through each of the four coils 145, the magnitude and direction of the resultant force in each of the coils 145 can be controlled independently, such that the lens is controlled to translate in two directions (x and y directions for optical image stabilization) and shift along the optical axis 180 (z direction for auto-focusing). Therefore, the magnetic interference-resistant translation-type optical image stabilization voice coil motor 100 can support both auto-focusing and optical image stabilization;

(2) As the groups of magnets 150 are positioned in the fixed structure, performance of the magnetic interference-resistant translation-type optical image stabilization voice coil motor 100 is not likely to be affected by external magnetic fields;

(3) Since the magnetic interference-resistant translation-type optical image stabilization voice coil motor 100 uses a translational lens, optical image stabilization can be achieved, and impact on the resolution at image edges can be reduced;

(4) By providing a press ring 120 that has a base body 122 of a relatively large thickness compared with the thin spring plate 130, the thin spring plate 130 can be protected effectively and its resistance to dropping can be enhanced. Moreover, the press ring 120 enables the spring plate 130 to be flattened below the lens carrier 140, thereby alleviating problems caused by nonflatness of the spring plate 130 such as movement and tilt during focusing and initial current errors, and increasing consistency and production yield of the magnetic interference-resistant translation-type optical image stabilization voice coil motor 100;

(5) By mating the first extension portions 1241 with the notches 148, and disposing the second extension portions 1243 and the third extension portions 149 alternately along the circumferential direction of the body 141 and in continuous contact with the stepped portion 118 along the circumferential direction of the body 141, the space between the lens carrier 140 and the base 110 is reduced, such that external dust can be prevented from arriving below the lens carrier 140 through the space between the lens carrier 140 and the base 110 and contaminating the filter or image sensor below the lens carrier 140, thereby improving reliability of the camera module;

(6) Due to a simple structure of the motor, reliability of the motor can be improved and production difficulty and cost of the motor can be reduced.

The above descriptions are merely preferred embodiments of the present invention. It should be noted that modifications or improvements made without departing from the principle of the present invention shall be encompassed in the protection scope of the present invention.

What is claimed is:

1. A magnetic interference-resistant translation-type optical image stabilization voice coil motor, comprising:

a base comprising a base plate, a through hole is formed in the base plate, and the base further comprises a stepped portion extending inward from an inner surface of the base plate;

a spring plate;

a lens carrier;

at least three groups of magnets; and a housing;

wherein the base, the housing, and the groups of magnets are connected together to form a fixed structure; and the at least three groups of magnets are arranged inside the housing; each of the groups of magnets comprises a first magnet and a second magnet; the first magnet is arranged on the base; the second magnet is stacked on the first magnet; and the first magnet and the second magnet have opposite magnetic field directions;

the lens carrier comprises a body and coils disposed on the body; the coils and the body are connected together to form a movable structure; the number of the coils is the same as the number of the groups of magnets; and each of the coils is disposed opposite to one of the groups of magnets; and the spring plate is connected to the lens carrier and one of the first magnet and the second magnet to form a spring oscillator system with multiple degrees of freedom; the spring oscillator system with multiple degrees of freedom comprises a spring center; and a resultant electromagnetic force of each of the coils faces the spring center or faces away from the spring center, the optical image stabilization voice coil motor further comprises a press ring which is disposed between the base and the spring plate, wherein the press ring comprises an annular base body and a plurality of extension elements formed on the base body, and the base body presses the spring plate below the lens carrier and is connected to the spring plate, the plurality of extension elements is regularly disposed on an inner surface of the base body along a circumferential direction of the base body; each of the extension elements comprises a first extension portion and a second extension portion; the first extension portion extends from the base body toward the lens carrier and into a corresponding notch on the lens carrier; and the second extension portion extends from the base body toward the base to come into contact with the stepped portion on the base;

wherein the lens carrier further comprises a plurality of notches and a plurality of third extension portions formed on the body thereof, the notches and the third extension portions are disposed alternately along a circumferential direction of the body, and the third extension portions extend from the body toward the stepped portion to come into contact with the stepped portion.

2. The magnetic interference-resistant translation-type optical image stabilization voice coil motor according to claim 1, wherein the first magnet and the second magnet have different shapes.

3. The magnetic interference-resistant translation-type optical image stabilization voice coil motor according to claim 1, wherein one part of the spring plate is connected to a top of the body; and another part of the spring plate is connected to the second magnet and the housing.

4. The magnetic interference-resistant translation-type optical image stabilization voice coil motor according to claim 1, wherein positioning portions are formed on the base; and the lens carrier further comprises positioning slots formed on the body; and the positioning portions are mated with the positioning slots.

5. The magnetic interference-resistant translation-type optical image stabilization voice coil motor according to claim 1, wherein the second extension portions and the third extension portions are disposed alternately along the circumferential direction of the body and in continuous contact with the stepped portion along the circumferential direction of the body.

* * * * *